(12) United States Patent
Minsky

(10) Patent No.: US 12,399,934 B2
(45) Date of Patent: *Aug. 26, 2025

(54) SYSTEM FOR MULTI-TAGGING IMAGES

(71) Applicant: The Software MacKiev Company, Boston, MA (US)

(72) Inventor: Jack M. Minsky, Boston, MA (US)

(73) Assignee: The Software MacKiev Company, Boston, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/428,156

(22) Filed: Jan. 31, 2024

(65) Prior Publication Data
US 2024/0176814 A1     May 30, 2024

Related U.S. Application Data

(63) Continuation of application No. 17/563,670, filed on Dec. 28, 2021, now Pat. No. 11,934,453, which is a
(Continued)

(51) Int. Cl.
| | |
|---|---|
| *G06F 16/00* | (2019.01) |
| *G06F 3/04817* | (2022.01) |
| *G06F 3/04842* | (2022.01) |
| *G06F 3/16* | (2006.01) |
| *G06F 16/483* | (2019.01) |

(Continued)

(52) U.S. Cl.
CPC ...... *G06F 16/5866* (2019.01); *G06F 3/04817* (2013.01); *G06F 3/04842* (2013.01); *G06F 3/165* (2013.01); *G06F 3/167* (2013.01); *G06F 16/483* (2019.01); *G06F 16/5846* (2019.01); *G06F 2203/04806* (2013.01)

(58) Field of Classification Search
None
See application file for complete search history.

(56) References Cited

U.S. PATENT DOCUMENTS

| | | |
|---|---|---|
| 8,094,132 B1 | 1/2012 | Frischling et al. |
| 8,200,669 B1 | 6/2012 | Iampietro et al. |
| (Continued) | | |

FOREIGN PATENT DOCUMENTS

WO   2008075338 A1   6/2008

*Primary Examiner* — Hasanul Mobin
(74) *Attorney, Agent, or Firm* — GTC Law Group PC & Affiliates

(57) ABSTRACT

A system with a simple, intuitive, efficient interface is described for creating multi-tagged image files and playing back the tags upon demand. The system includes a display for displaying the image, a user interface is adapted to receive user input to create a user-selectable zone around each selected location, a recording device for creating an object associated with each user-selectable zone and a packing device that merges the image, the user-selectable zones and their associated objects into a tagged image file having a unique filename extension indicating that it is a tagged image file, and saving the tagged image. On playback, the image is displayed to the user who may select a user-selectable zone. The object file associated with that zone is played back. The user may also select an option that causes the objects to autoplay in a pre-determined sequence. The user may also delete, edit, or re-record objects.

20 Claims, 12 Drawing Sheets

Related U.S. Application Data continuation of application No. 16/288,118, filed on Feb. 28, 2019, now Pat. No. 11,250,050, which is a continuation-in-part of application No. 16/285,728, filed on Feb. 26, 2019, now abandoned.

(60) Provisional application No. 62/636,841, filed on Mar. 1, 2018.

(51) Int. Cl.
 *G06F 16/58* (2019.01)
 *G06F 16/583* (2019.01)

(56) References Cited

U.S. PATENT DOCUMENTS

| | | | |
|---|---|---|---|
| 8,216,056 | B2 | 7/2012 | Lutnick et al. |
| 8,589,402 | B1 | 11/2013 | Iampietro et al. |
| 8,872,843 | B2 | 10/2014 | Nam et al. |
| 9,081,798 | B1 | 7/2015 | Wong |
| 9,495,783 | B1 | 11/2016 | Samarasekera et al. |
| 9,703,456 | B2 | 7/2017 | Park |
| 10,272,742 | B2 | 4/2019 | Chavez Hernandez et al. |
| 11,250,050 | B2 | 2/2022 | Minsky |
| 11,934,453 | B2 | 3/2024 | Minsky |
| 2005/0060238 | A1 | 3/2005 | Gravina et al. |
| 2005/0096042 | A1 | 5/2005 | Habeman et al. |
| 2005/0164151 | A1* | 7/2005 | Klein ............ G09B 5/06 434/304 |
| 2007/0079321 | A1* | 4/2007 | Ott ............ H04H 60/73 725/135 |
| 2007/0127747 | A1 | 6/2007 | Doyle |
| 2007/0198112 | A1 | 8/2007 | Griffin |
| 2008/0010602 | A1 | 1/2008 | Redpath |
| 2008/0088646 | A1 | 4/2008 | Sako et al. |
| 2008/0172789 | A1 | 7/2008 | Elliot et al. |
| 2009/0171487 | A1* | 7/2009 | Wilhelm ............ G11B 27/10 700/94 |
| 2009/0289917 | A1 | 11/2009 | Saunders |
| 2010/0032899 | A1 | 2/2010 | Gearty |
| 2010/0157096 | A1 | 6/2010 | Park et al. |
| 2012/0179541 | A1* | 7/2012 | Pasila ............ G06Q 30/02 705/14.71 |
| 2012/0306793 | A1 | 12/2012 | Liu et al. |
| 2013/0047124 | A1 | 2/2013 | Holland et al. |
| 2013/0050403 | A1* | 2/2013 | Jang ............ H04N 23/63 348/36 |
| 2013/0291079 | A1 | 10/2013 | Lowe et al. |
| 2014/0210828 | A1* | 7/2014 | Fleizach ............ G06F 3/04842 345/173 |
| 2014/0300720 | A1 | 10/2014 | Rothberg |
| 2014/0314391 | A1* | 10/2014 | Kim ............ G06F 3/04842 386/248 |
| 2014/0344248 | A1* | 11/2014 | Stoop ............ H04L 43/045 707/722 |
| 2015/0092006 | A1* | 4/2015 | Grossman ............ H04L 51/10 348/14.06 |
| 2017/0091906 | A1 | 3/2017 | Liang et al. |
| 2017/0289495 | A1* | 10/2017 | Farrell ............ H04N 9/8211 |
| 2018/0113577 | A1 | 4/2018 | Burns et al. |
| 2018/0121458 | A1 | 5/2018 | Shin |
| 2019/0147305 | A1* | 5/2019 | Lu ............ G06F 18/2413 382/157 |
| 2019/0272094 | A1 | 9/2019 | Minsky |
| 2019/0272285 | A1 | 9/2019 | Minsky |
| 2020/0043488 | A1 | 2/2020 | Park |
| 2020/0075155 | A1 | 3/2020 | Huang |
| 2022/0121706 | A1* | 4/2022 | Minsky ............ G06F 16/58 |
| 2024/0176814 | A1* | 5/2024 | Minsky ............ G06F 16/483 |

\* cited by examiner

*Figure 4*

| |
|---|
| Non-volatile memory device 800 |
| Image memory 801 |
| 1st Touch-sensitive zone 803 |
| 1st Object data 805 |
| 2nd Touch-sensitive zone 807 |
| 2nd Object data 809 |
| ... |
| End of data 811 |
| Object playback info 115 |
| Object playback code 115 |

SYSTEM FOR MULTI-TAGGING IMAGES

CROSS REFERENCE TO RELATED APPLICATIONS

This application is a continuation application of U.S. patent application Ser. No. 17/563,670, filed Dec. 28, 2021, published as U.S. Publication No. 20220121706 and entitled "SYSTEM FOR MULTI-TAGGING IMAGES".

U.S. patent application Ser. No. 17/563,670 is a continuation application of U.S. patent application Ser. No. 16/288,118, filed Feb. 28, 2019, now U.S. Pat. No. 11,250,050 and entitled "SYSTEM FOR MULTI-TAGGING IMAGES".

U.S. patent application Ser. No. 16/288,118 is a continuation-in-part of U.S. patent application Ser. No. 16/285,728, filed Feb. 26, 2019, now abandoned, and entitled "SYSTEM FOR MULTI-TAGGING IMAGES".

U.S. patent application Ser. No. 16/285,728 claims priority to and the benefit of U.S. Provisional Patent Application 62/636,841, filed Mar. 1, 2018, and entitled "SYSTEM FOR MULTI-TAGGING IMAGES".

All of the foregoing patent documents are incorporated herein by reference in their entirety.

STATEMENT REGARDING FEDERALLY SPONSORED RESEARCH

Not applicable.

BACKGROUND OF THE INVENTION

1. Field of the Invention

The current invention is an easy-to-use, intuitive system for tagging images with multiple embedded recordings or other media files (each a "live object") on each image, which can then be replayed by simply selecting (for example, by tapping or clicking) user-selectable zones on the image where object is embedded.

2. Description of Related Art

Digital images, which may be photographs or graphics, are captured or imported and then viewed on various computing equipment, such as "smart" cell phones, computing tablets, laptops, desktops, and other computing equipment, each a "computing device."

Audio Notations

There are devices that can overlay visual information to provide information about the image. However, using live objects, such as audio and video clips, adds value to the image.

There have been attempts to add audio annotation to an image, such as described in US 2007/0079321 A1 Ott, IV, published Apr. 5, 2007, titled "PICTURE TAGGING" ("Ott"). Ott described linking a pre-existing media file, such as a still image, to another media file, such as an audio media file. Ott disclosed using conventional file formats. Together, these files would provide a single audio explanation of the overall image without specifically identifying any location or features of the image.

Need Both Files

The image and audio files in Ott's invention must be kept together, not as separate and different files to be rendered together. If these files were not kept together, either the image or sound annotation would be lost during playback.

Since images are intended to be saved for a long period of time, it is important that they can be recovered and played back at a much later time. It is difficult to keep two files together for a long period of time. Copying and transferring files over a period of time may result in these files being stored in different folders/locations. If both are not available at the time of playback, either the image or tagging will be lost.

Applies to Overall Image

As indicated above, the tagging comments referred to in Ott apply to the entire image, and not to any specific location(s) on the image.

Changing Media Formats

Media players and their corresponding file formats are constantly being updated with new versions of media players. Also, new media players and formats are constantly being developed and implemented. Since there are many formats, and many versions of each format, it is not possible to support them all. Therefore, each media player supports only a few selected formats and versions. Usually, older versions are dropped and no longer supported. Therefore, if the newer media player versions are not "backward compatible" with the version of the image/audio files, they may not be capable of playing the image/audio files even though those files are of the same format but are older versions.

Many old files may not be playable on current players that do not support a format/version that is compatible with the old files. Therefore, it is possible that the user has an image and a corresponding tagging file but does not have a compatible player.

This is likely to become a significant problem, since it is common to archive old pictures and view them many years later.

Less Intuitive

Prior art methods of linking an image file to a tagging file take some degree of editing or set up and are not very intuitive. Most require several steps including entering an edit mode, selecting objects, tagging those objects, and then copying them to a file or program. This process can become cumbersome when a user is trying to tag many images. This is especially true when a user is attempting to capture a stream of information from recalled memories, which, once the flow is interrupted, may be frustratingly lost, especially when elderly users are recalling events that took place decades earlier.

These prior art methods typically require significant editing capabilities and are difficult to implement on tablets or smart phones.

Many times, there is no supplemental information provided with a picture. It is useful to know who took the picture and when, where, and how the image was acquired, as well as the circumstances of the image's acquisition.

There currently are no systems that make a person or object in the image more prominent than the rest of the image during playback of live objects (such as audio and video clips), which is helpful for associating the live object being played back with the person or object in question.

Currently, there is a need for a system which can quickly, easily and without interruption, allow creation and playback of an image with multiple tags, each associated with a portion of the image.

BRIEF SUMMARY OF THE INVENTION

The current invention may be described as a method of creating an object tagged image (OTI) file having a uniform filename extension. This is done by acquiring an image, displaying the image to a user on a user interface, receiving user input through the user interface identifying a plurality of user-selected locations on the image, expanding each acquired location into a user-selectable zone. Then the method continues by acquiring at least one object data file and associating each with a user-selectable zone, acquiring descriptive information for the image using a recording device, merging the image, user-selectable zone and object data, and descriptive information into an object tagged image (OTI) file with packaging device; and encoding a medium with a pattern representing the OTI file in a non-volatile memory device including a filename having a uniform filename extension indicating that it is an OTI file.

The current invention may also be described as a method of playing back pre-stored objects in an object tagged image (OTI) file. This is done by employing a playback device to acquire at least one OTI file; using a controller to read a format identifier from the acquired file format verifying that the acquired file is an OTI file, extracting a prestored image from the OTI file; displaying the image on a user interface; identifying in the OTI file a plurality of user-selectable zones; displaying the user-selectable zones on the displayed image. The method continues by monitoring the user interface to identify when a user-selectable zone is selected, playing back an object data file associated with the user-selectable zone selected with the playback device, and making a portion of the image inside of a user-selectable zone more prominent when an object data file associated with this user-selectable zone is being played.

Another way to describe the invention is a system for tagging an image having a user interface capable of displaying the image to a user and acquiring at least one user-defined location on the image from the user through a user interface. The system includes a microphone adapted to acquire sounds; a recording device having an audio recording device coupled to the microphone which receives sounds from microphone and creates audio data files; a voice to text device that receives sounds form microphone, recognizes speech and creates text for descriptive information; and an editor which receives user input through a user interface and creates text for descriptive information. There is also a memory having locations for storing executable code, the acquired image, user-defined locations, associated object data files and descriptive information. A controller is coupled to the memory adapted to run executable code stored in the executable memory, to control the user interface to display the image, receive user input defining locations on the image, create user-selectable zones around the user-defined locations, associate (tag) the user-selectable zones with object data files acquired by the recording device, acquire names and descriptive information relating to the user-selectable zone and store with the images, tagged user-selectable zones and associated objects as a unitary file in the memory.

BRIEF DESCRIPTION OF SEVERAL VIEWS OF THE DRAWINGS

The above and further advantages may be better understood by referring to the following description in conjunction with the accompanying drawings, in which like numerals indicate like structural elements and features in various figures. The drawings are not necessarily to scale, emphasis instead being placed upon illustrating the principles of the concepts. For example, the dimensions of some of the elements in the figures may be exaggerated relative to other elements to help to improve understanding of various example embodiments. Also, common but well-understood elements that are useful or necessary in a commercially feasible embodiment are often not depicted to facilitate a less obstructed view of these various example embodiments.

FIG. 4 is an illustration of a non-volatile memory device having a readable pattern encoded on a plurality of memory elements, representing stored data and executable code.

DETAILED DESCRIPTION

Figure 1A:
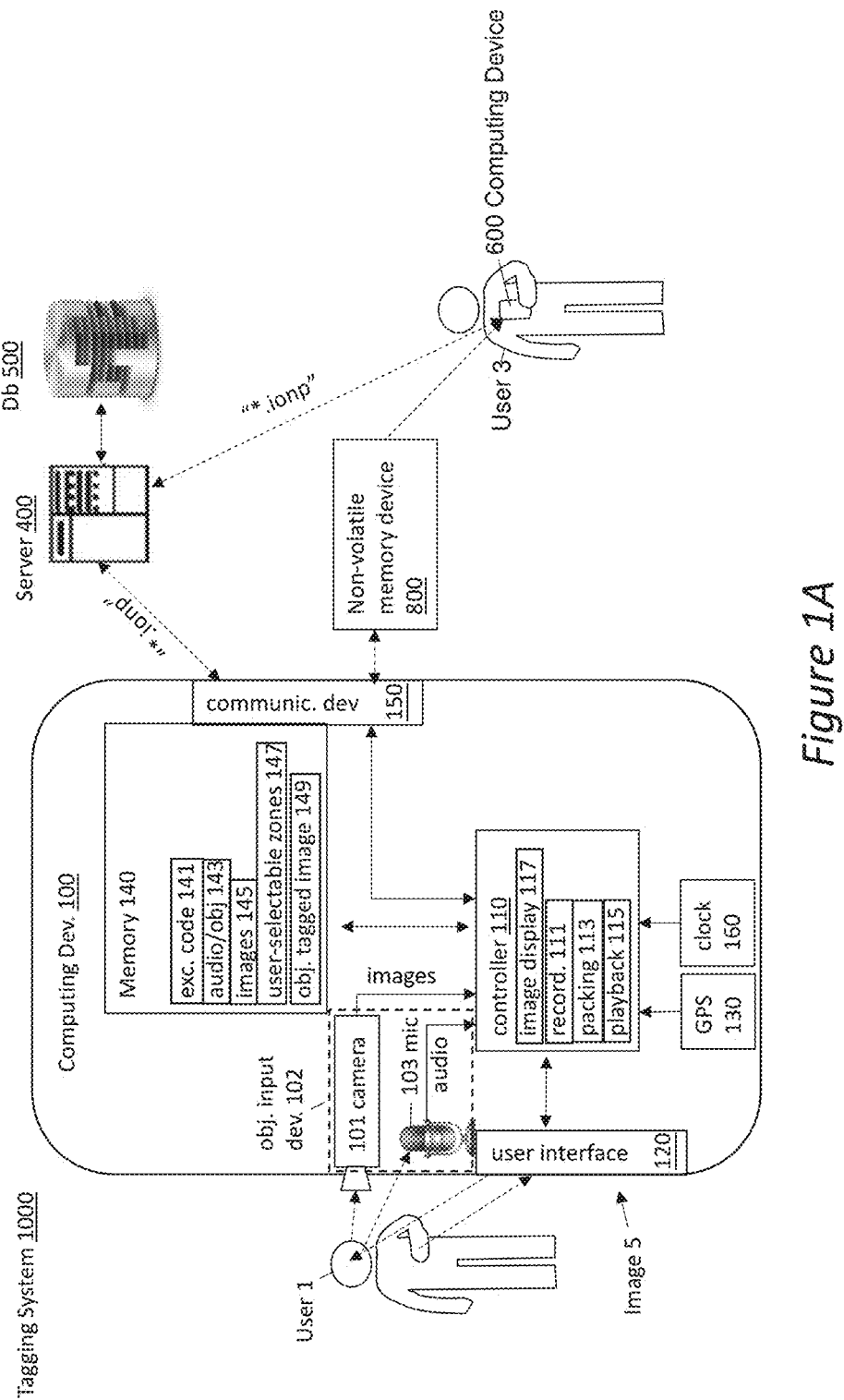
FIG. 1A illustrates a general overall schematic diagram of a tagging device according to one embodiment of the current invention.

Theory
Tagging Images

As there is a story inherent in photographs of people, places and objects, the value of an image may be greatly enhanced by permanent recordings made by someone familiar with what is depicted, when those recordings can be retrieved simply by tapping user-selectable zones to hear those stories retold any time in the future. (If the object data is an audio clip, each such zone may be referred to as a "sound spot." If the invention is being implemented on a touch screen device, each such zone may be referred to as a "touch sensitive zone.") While this is quite true of newly taken photographs, it is even more so regarding older photographs when there is someone still alive who remembers the people and places captured in them or when a descendent or historian wishes to learn about the people and places pictured. The memories captured and associated with user-selectable zones will be invaluable to the family historian. And it isn't difficult to imagine the delight of generations to come when they tap a face in a user-selectable zone of an enhanced digital photograph and hear their great grandmother's voice telling them one by one about a dozen relatives pictured at a wedding that took place a hundred years ago. This would be very valuable in the field of genealogy in general and with respect to genealogy software specifically.

The ease of use of the current invention makes it especially useful in schools, where a student might document the process of creating a third-grade project with a background recording, and then tap an object or region and record a description of it, and, without stopping, tap another region and record another explanation, and so forth, until a full expression of the meaning they have embodied in their creation is captured in the image. The simplicity has the potential to provide great benefits in the enhancement of student presentation skills and personal expression and to allow teachers to review the thinking behind art to understand how a student perceives it in evaluating that work.

One requires a recording device to capture images, audio or other physical phenomena as a datafile. A playback device is capable of receiving the datafile and reversing the process to display the images, and playback audio and other objects. The playback device must be able to decode the datafile created by the recording device.

If more than one live object is being captured (e.g. multiple audio files or an audio file and a video file), then the playback device should be able to fully decode the datafile back into the same number of live objects. Those live objects may be formatted for playback in multiple types and classes of playback devices to achieve ease of use and efficiency.

A recording device is required only when one would like to add, delete or modify the tags of an image. If one simply wants to play back the tags, a recording device is not required.

Recording devices and playback devices may have hard-wired buttons to perform specific functions. Soft buttons also may be implemented in software in which buttons may be displayed on a screen, and a function implemented when the button is touched, in the case of a touch-sensitive screen, or has been clicked on, in the case of mouse-controlled graphic user interfaces. The recording device has logic that monitors the buttons and performs a function associated with the button when the button is selected.

One of the button selections of the recording device selects an option to encode signals into object data associated with a user-selectable zone, also referred to as a 'tag' file. The object data, user-selectable zones, and image are stored as an object tagged image (OTI) file. Encoding may be done by a coding device or by a routine referred to as a codec.

The preferred output type for the object tagged image file is presently an HTML5 file. (It is understood that the output type will need to be made compatible with successors to HTML5 and other new or widely-adopted types. For example, at some point the default output type may be changed to HTML6. Similarly, other output format options may be added.) This outputted file can then be opened on any modern web browser on a computing device and the user-selectable zone may then still be tapped for playback or played in presentation mode. The playback device may be implemented in hardware, software or a combination of both. This adds to the longevity of the current system and its file type.

In another embodiment, the playback device can be separated into a codec that decodes the datafile and elements that run all other functions such as displaying and monitoring a user interface.

Portions of the executable code to operate the playback device may be copied to the tagged image file.

The codecs used by the playback device to decode the tagged image file may also be copied to the tagged image file.

Any code that is stored in the datafile is guaranteed to be available when the datafile is played back. However, the more executable code that is stored in the datafile, the larger the datafile becomes. Therefore, it is a trade-off as to what should be stored in the datafile.

In the Windows Operating System, the Macintosh Operating System, the iOS Operating System, the Android Operating System, and other operating systems, each file is given a filename with an extension (following a period). This defines the format of the file. It is proposed that at least one new extension be defined for the datafiles described above. The recorder will operate to create data files having the same unique filename extension indicating the file types.

Implementation

Throughout this application, it is understood that we will explain the structure, functioning and advantages of the current system in terms of sound spots associated with an audio data file for simplicity; however, it is understood that the sound spots may be user-selectable zones having an associated object data file in which the object data file may be a file other than an audio data file, such as a video clip or an animation.

Also, even though the features are described in the context of tagging a photograph of people, it is understood that the spirit of the invention covers, more generally, tagging parts of a map, a technical diagram, a photo of animals, architectural drawings, or any other image that may benefit from additional information.

All of the elements shown and described here may be implemented as a) active devices that perform their own functions, or b) devices that are at least in part controlled by a controller. Most are implemented as hardware running dedicated software; however, some may be software routines run by the controller.

The tag recording and editing functions of the tagging system 1000 will be explained in connection with FIGS. 1A-1D, 2A-2E, 3A, 3B and 4. This applies to a system which has both record and playback functionality.

A user 1 has a "computing device" 100 which may be, at least in part, a "smart" cell phone, computing tablet, laptop, desktop, or other computing equipment.

In another embodiment, another user 3 is shown with a similar computing device 600 that also communicates with the tagging system 1000.

Computing device 100 has a user interface 120 which may be a conventional input or output device used with computing equipment. Preferably this is a touch-sensitive display commonly used with smart phones and tablets.

Computing device 100 has a controller 110 which can read and execute executable code 141 stored in memory 140. This executable code 141 may be referred to as an "App".

The controller 110 employs an image display device 117 for displaying an image 5, which was prestored in image memory device 145 of memory 140. This image 5 may also be one that was acquired by camera 101, and then stored.

A recording device 111 creates an object data file. In the example embodiment, recording device 111 records audio from the microphone 103, encodes it into an object datafile and stores it in audio/object memory 143 of memory 140.

Figure 2A:
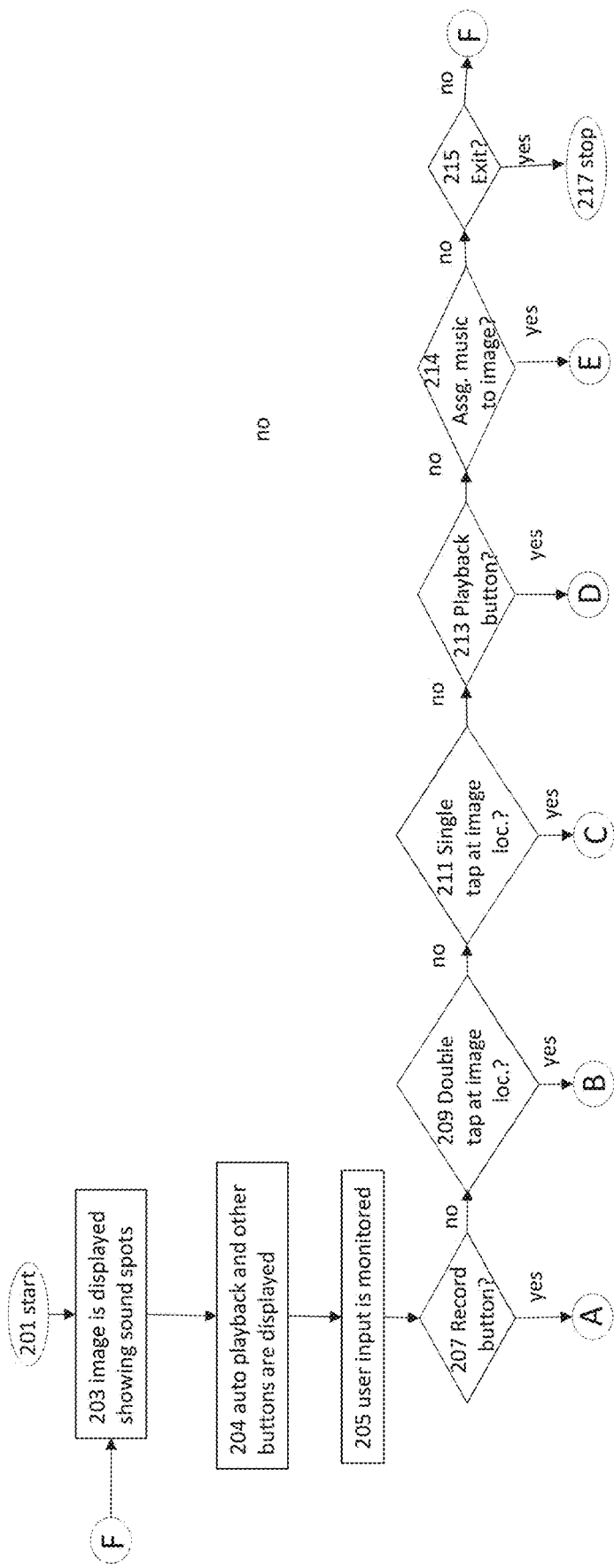
FIGS. 2A-2F together are a flowchart illustrating the functioning of the tagging system of FIG. 1.

The recording process begins at step 201 of FIG. 2A.

In step 203, user 1 interacts through user interface 120 with controller 110 to load an image that was pre-stored in image memory 145 of memory 140, or if previously tagged, from object tagged image memory 149.

The image is displayed on user interface 120 in step 203 with any user-defined locations and surrounding user-selectable zones of the image. These user-selectable zones have previously been associated with an object data file, such as an audio recording of a voice description associated with that region, which may be referred to as a "sound spot." The object data files may alternatively be video files, computer animations, or simulations.

In an alternative embodiment, controller 110 connects to a server 400 through a communication device 150 to download a pre-stored image. The server 400 communicates with a database 500, This would be the case when images are stored in a "cloud." Alternatively, the image 5 may be copied from a non-volatile memory device 800.

In step 205, user 1's input is monitored. In this preferred embodiment, user interface 120 is a touchscreen. Other buttons, such as a "Record," "Stop," and "Playback" may be displayed on the touchscreen. Any conventional means of communicating though a touchscreen may also be used to activate different functions, such as double tapping the screen, dragging across the screen, swiping the screen, multiple finger dragging, etc.

Figure 2B:
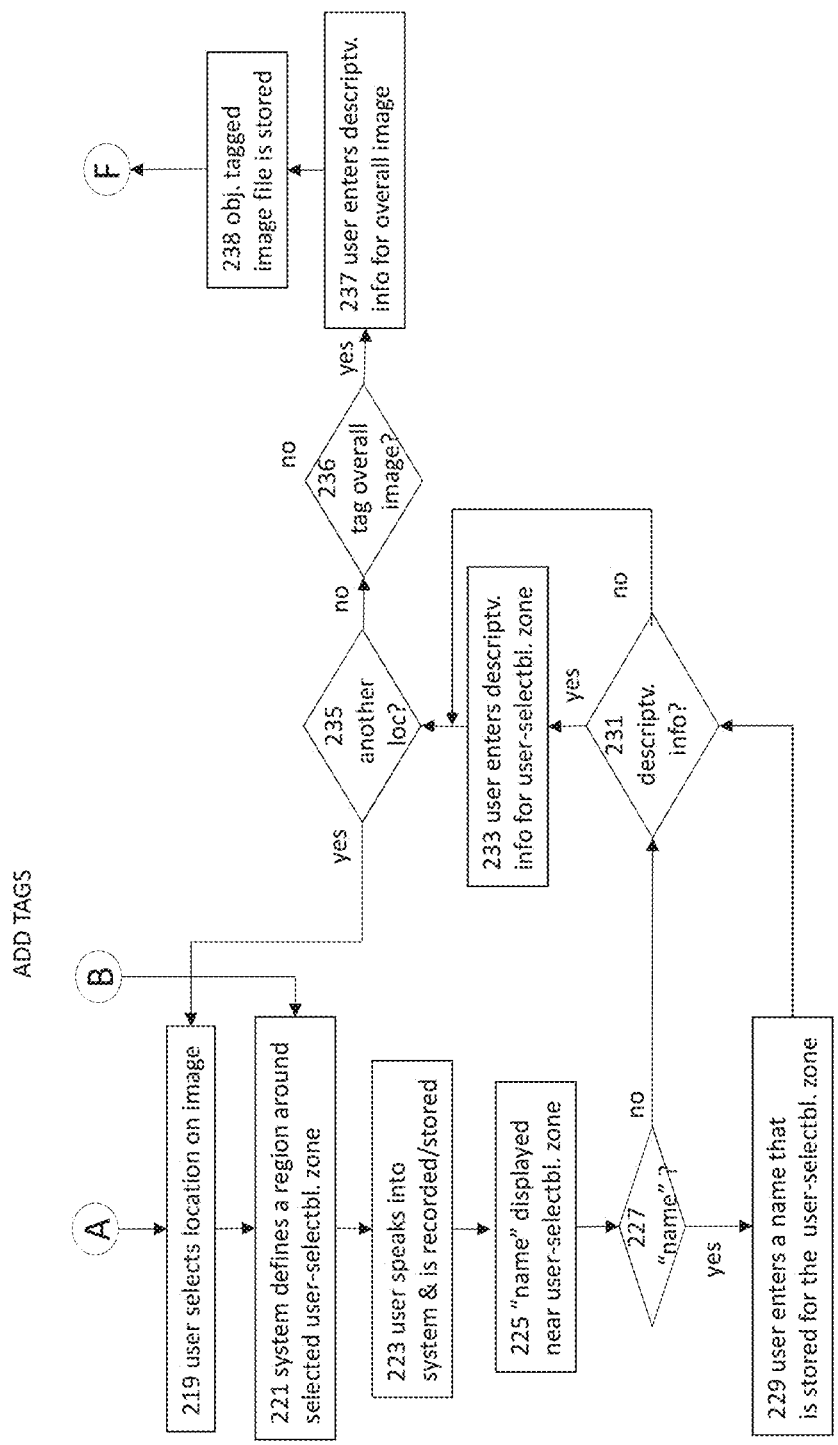

In step 207, if it is determined that user 1 has selected the "Record" button displayed on the display screen, or in step 209 the user double taps the display screen, the system drops into the record mode indicated by FIG. 2B.

Processing then continues to step 219 of FIG. 2B if the "Record" button was selected. If the screen was double tapped, then processing continues at step 221.

In step 219, the user selects a location on the displayed image. Since this example is using a touchscreen, this is simply done by touching the intended location on the image. Other appropriate input hardware may be used with other systems, including a mouse, trackball, or virtual reality headset to select locations on the image.

In step 221, the system defines a region around the selected location that can be tagged with an object, referred to as a user-selectable zone. (If the user-selectable zone is associated with a sound clip, it may be referred to as a "sound spot.") By selecting anywhere in this user-selectable zone, the user may add or edit object data which may be audio, video, animations, notations, or the like. User selectable zones may be sized automatically using face or object recognition algorithms, may be set to a default size, or may be sized manually by user 1. The user-selectable zone may be a circle, a shape selected by the user from a menu of choices, a shape drawn by the user using the user interface 120, or a shape determined by running a face or object recognition algorithm.

When a user indicates that he/she wants to enter the recording mode by providing an appropriate user input, processing continues at step 221, since step 219 has already been completed.

In step 223 the user simply speaks to the tagging system 1000 and the speech is automatically recorded, associated with the user-selectable zone and stored in user-selectable zone memory 147.

In step 225, the system 1000 prompts the user for a name for the user-selectable zone.

If the user does not have a name or does not want to add a name in step 227, ("no") then processing continues at step 231.

If user 1 wants to name the user-selectable zone ("yes"), then in step 229, user 1 enters a name that is stored for this user-selectable zone.

In step 231, user 1 is asked if user 1 would like to add descriptive information associated with the user-selectable zone.

If so ("yes"), user 1 enters descriptive information in step 233, which is stored in user-selectable zone memory 147. (This step is described in greater detail in connection with FIG. 2E, below.)

If not, processing continues at step 235.

In step 235 the tagging system 1000 determines if the user has selected the "Stop" button on the touchscreen, or otherwise has indicated that he/she is finished adding tags to the image.

If the user would like to continue creating tags ("yes"), processing continues from steps 219 through 235 for each additional tag. The user can continue to select locations on the image and provide descriptions. This fast, intuitive, and easy interface allows a user to tag many locations of an image quickly and without having to enter a library or select, open and close routines to set up tags.

In step 236, user 1 is asked to provide information about the overall image 5.

If user 1 declines ("no"), then processing returns to step 203 of FIG. 2A.

If the user wants to add a name, ("yes"), then in step 237 the user can add descriptive information that applies to the overall image 5. This may be typed in using a conventional input device, user interface 120 or can be dictated into text, similar to that described in connection with FIG. 2E. This descriptive information may be stored in multiple fields. The descriptive information regarding a user-selectable zone containing the image of a person may be contained in fields for First Name, Last Name, Nickname, and Narrator.

In step 238, at least image 5, user-selectable zones, object data files, and any settings are stored in the object tagged image (OTI) memory 149.

Processing then continues by returning to step 203 of FIG. 2A.

As is shown above, the current invention can record audio with a single click for each user-selectable zone, and record multiple user-selectable zones sequentially, unlike the prior art. This makes tagging photos intuitive, easy and efficient.

Figure 2C:
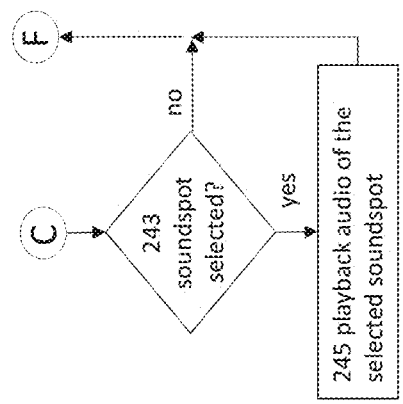

Returning back to processing at step 203 of FIG. 2A, if the user single taps the image on the touchscreen, ("yes"), then processing continues at step 243 of FIG. 2C.

In step 243, it is determined whether the screen location selected is within a user-selectable zone.

If so ("yes"), in step 245, the audio recorded for this sound spot is taken from audio memory 143 of FIG. 1 and played back by playback device 119, which is an audio speaker for audio objects.

Processing then continues at step 203 of FIG. 2A.

Auto Playback Mode

Auto playback is described in connection with FIGS. 2A and 2D.

Figure 2D:
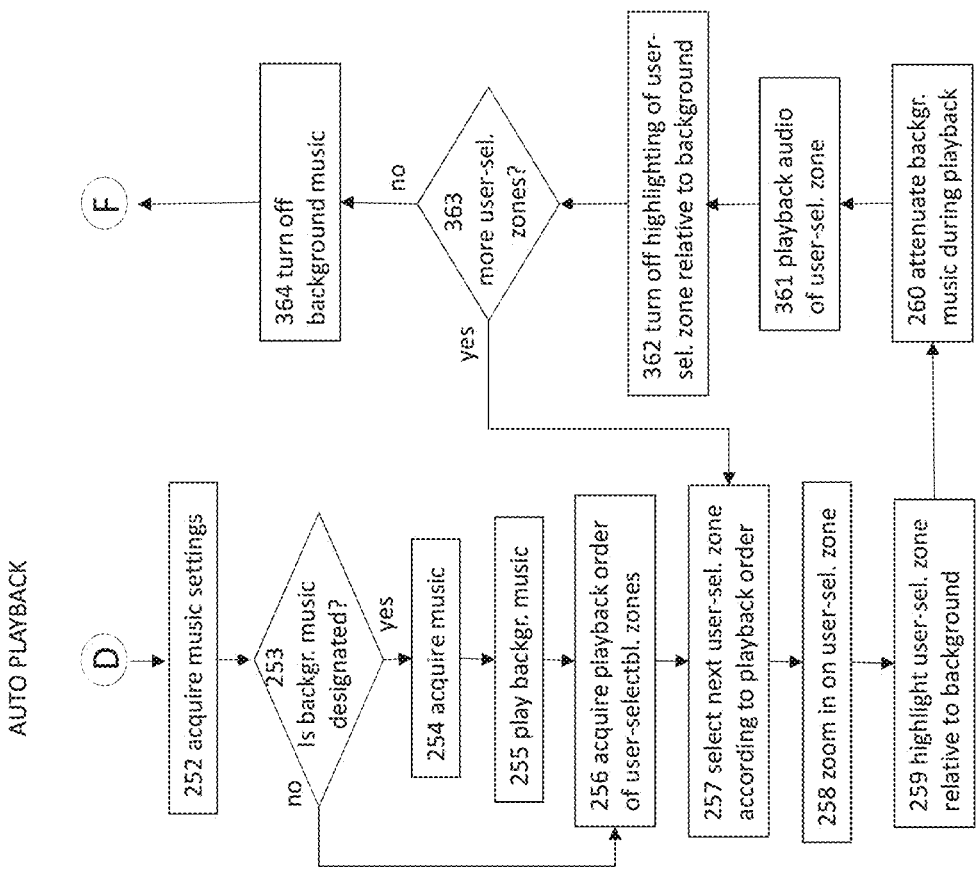
Figure 2E:
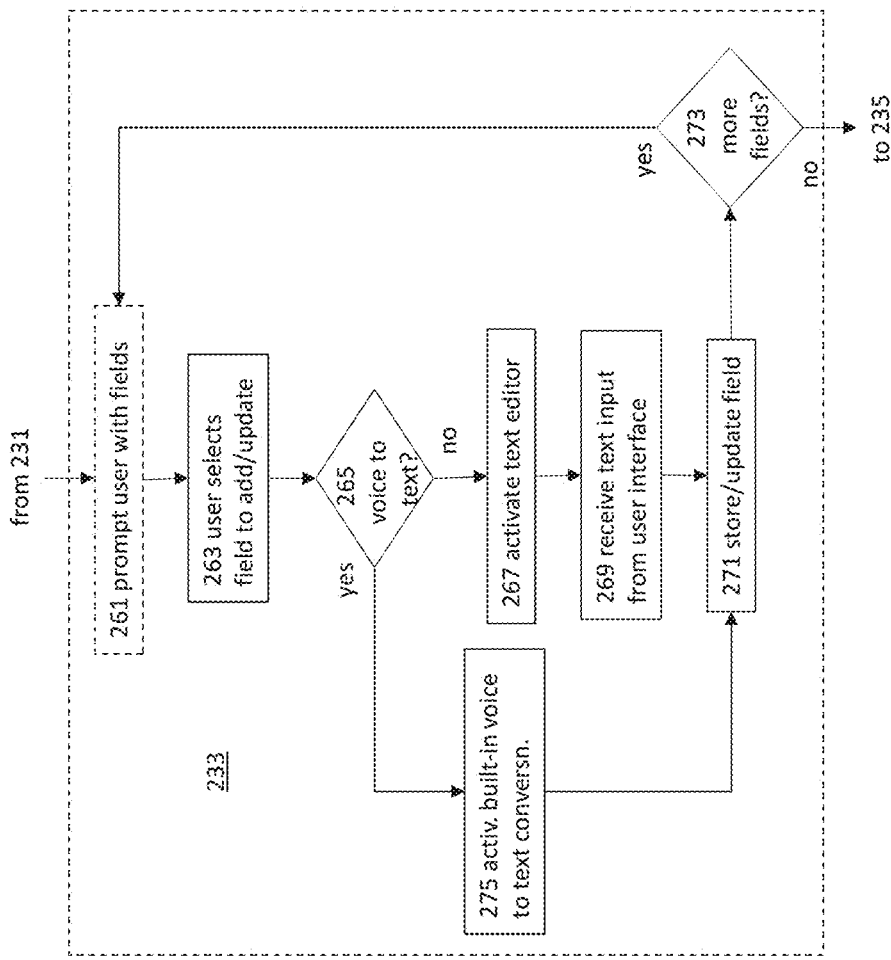

If at step 213 of FIG. 2A, the controller 110 senses that the user has selected an "Auto Playback" button on user interface 120, processing then continues to play all sound spots starting at step 252 of FIG. 2D.

This starts an auto-playback mode of FIG. 2D, which is a kind of mini-documentary playing the sounds associated with the image overall first.

Figure 3A:
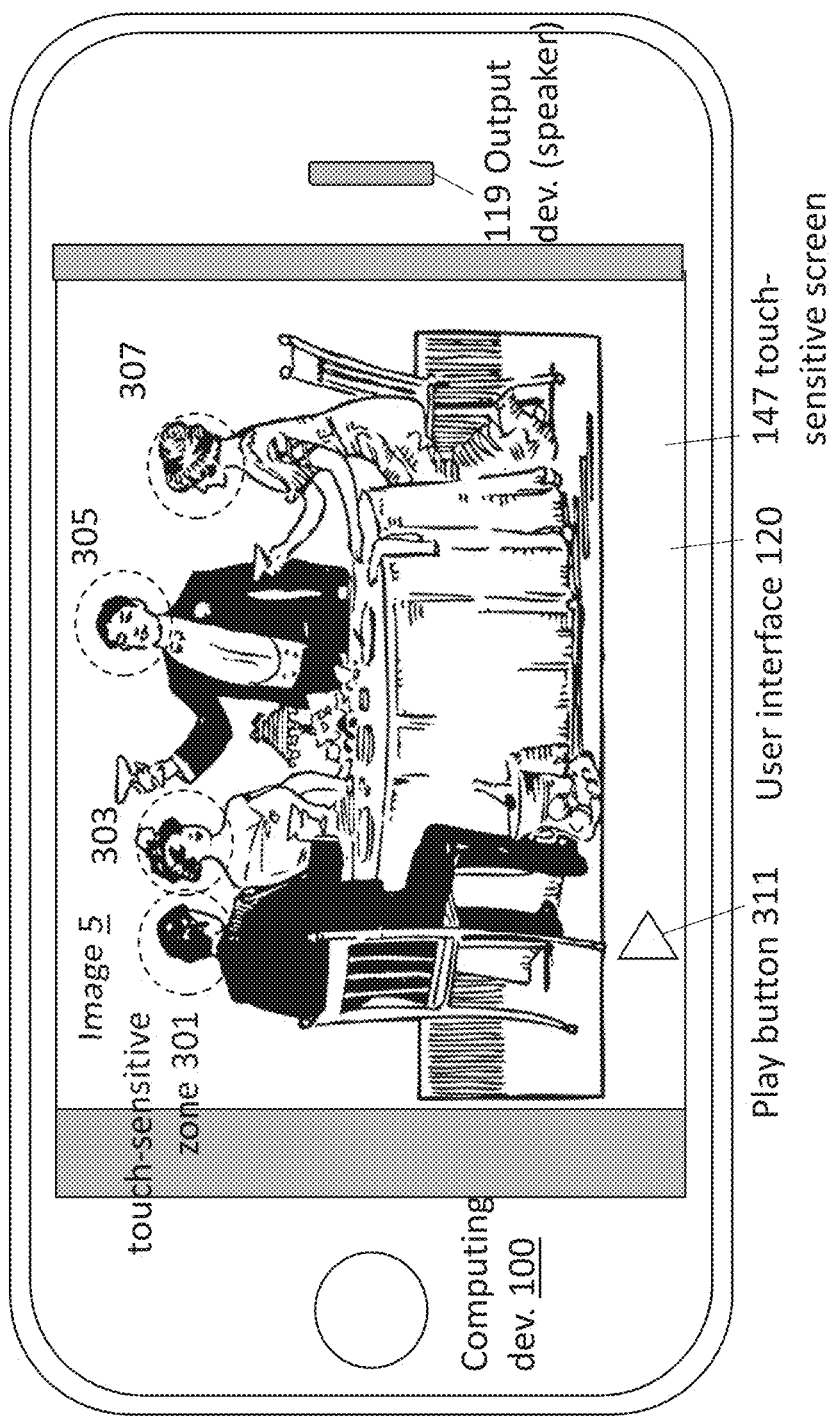
FIG. 3A is an illustration of a screen of a computing device of the tagging system of FIG. 1A-1D, used in connection with an explanation of its functioning.

As an example, FIG. 3A shows an image of a wedding. An audio tag for the overall image is played that states "This is Mimi's wedding at the Waldorf" which describes the photograph in which a few wedding guests appear. There are four user-selectable zones 301, 303, 305, and 307 in this photograph, containing the face of each guest.

In step 252, the background music settings for the image are acquired from memory 140.

In step 253, it is determined if background music has been designated to be played during playback of audio/object data files of the image's user-selectable zones.

If not ("no"), then processing continues at step 256.

If so ("yes"), then proceed to step 254.

In step 254, background music that has been previously identified is acquired form memory 140, or from a remote database 500.

In step 255, acquired background music is played by music device 903.

In step 256, prestored background order for playback of the user-selectable zones is acquired from user-selectable zone memory 147.

In step 257, a next user-selectable zone is loaded according to the acquired playback order.

For example, if the next user-selectable zone to be played is that of the head of Uncle Al, 305, then in step 258 the viewpoint is zoomed into Uncle Al's head.

Figure 3B:
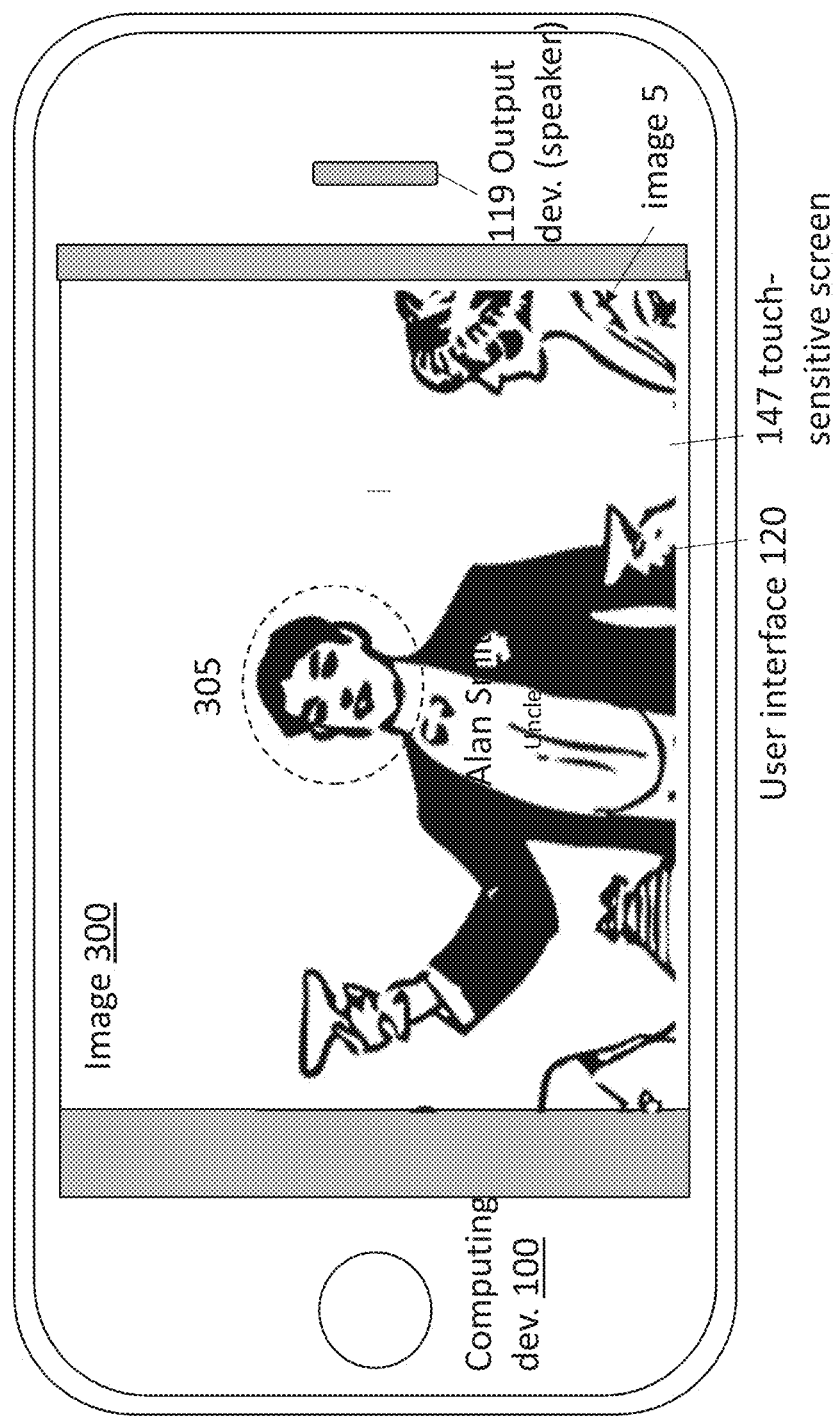
FIG. 3B is an illustration of FIG. 3A showing an enlarged user-selectable zone.

In step 258, an image effects device 905 zooms in on the portion of image 5 inside of user-selectable zone 305 shown in FIG. 3A and dims the portion of the image 5 that is outside of user-selectable zone 305. Image effects device 905 may then display selected description information about the person or object in the user-selectable zone below the user-selectable zone. In this example, the full name (consisting of first name and last name) and nickname of the person pictured are displayed with the full name shown in a larger font size than the nickname. This step is shown in FIG. 3B. The zoomed-in view of user-selectable zone 305 is displayed by image display 117 on user interface 120. A blow up of image display 117 and related elements are shown in FIG. 1C.

Even though this example shows a zoomed-in version of user-selectable zone 305 with portions of image 5 outside that zone dimmed, other ways of accentuating the active user-selectable zone may be performed. Another would be to change the color of the user-selectable zone.

In step 260, music device 903 automatically lowers the volume of background music while (sound) object files are playing, and then raises the volume level between and after the object files have been played. There may also be a manual sound control that allows users to raise or lower (all the way to mute) the background music.

In step 261, the audio/object data file for user-selectable zone 305 (which may be a verbal description of Uncle Al) is played back to user 1.

In step 263, it is determined if there are other user-selectable zones on this image. If so ("yes"), processing continues at step 257.

In step 257, the next the user-selectable zone in the designated order is loaded. In this case, it is one associated with user-selectable zone 303 circling Aunt Nell's face.

The process is repeated for steps 257-263 for each of the user-selectable zones.

In step 263, if it is determined that there are no more user-selectable zones to be played ("no"), the background music is turned off in step 364. Processing then continues at step 203 of FIG. 2A.

Figure 1C:
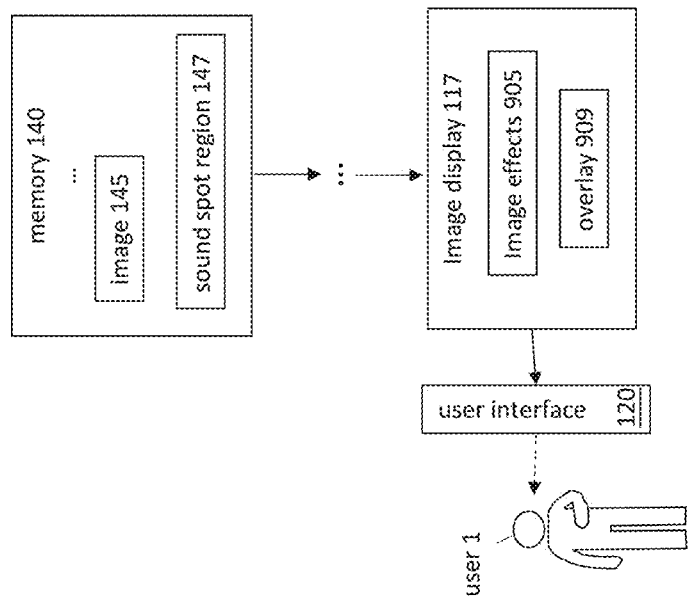
FIG. 1C is a more detailed schematic diagram of the image display device of FIG. 1A with related elements.
Figure 1B:
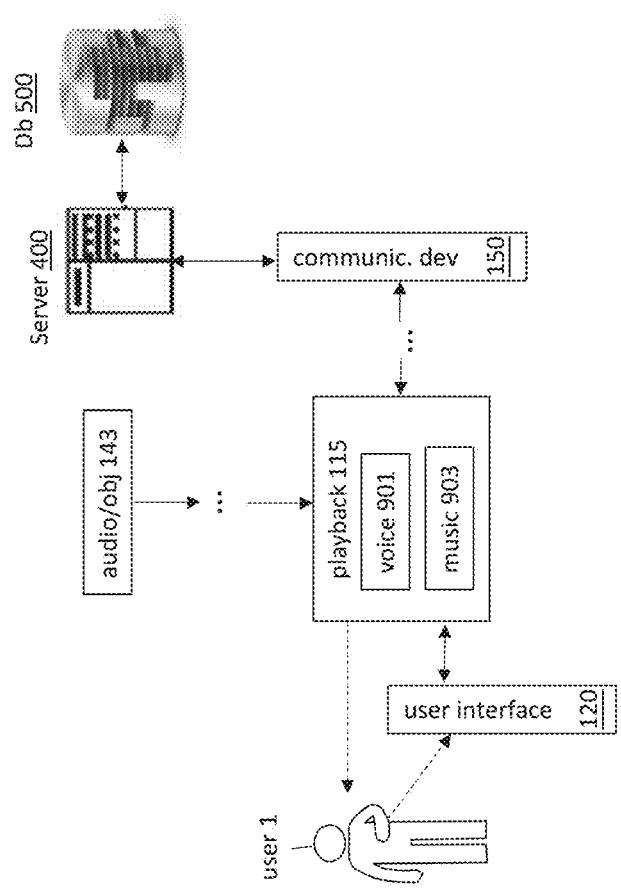
FIG. 1B is a more detailed schematic diagram of the playback device of FIG. 1A with related elements.
Figure 1D:
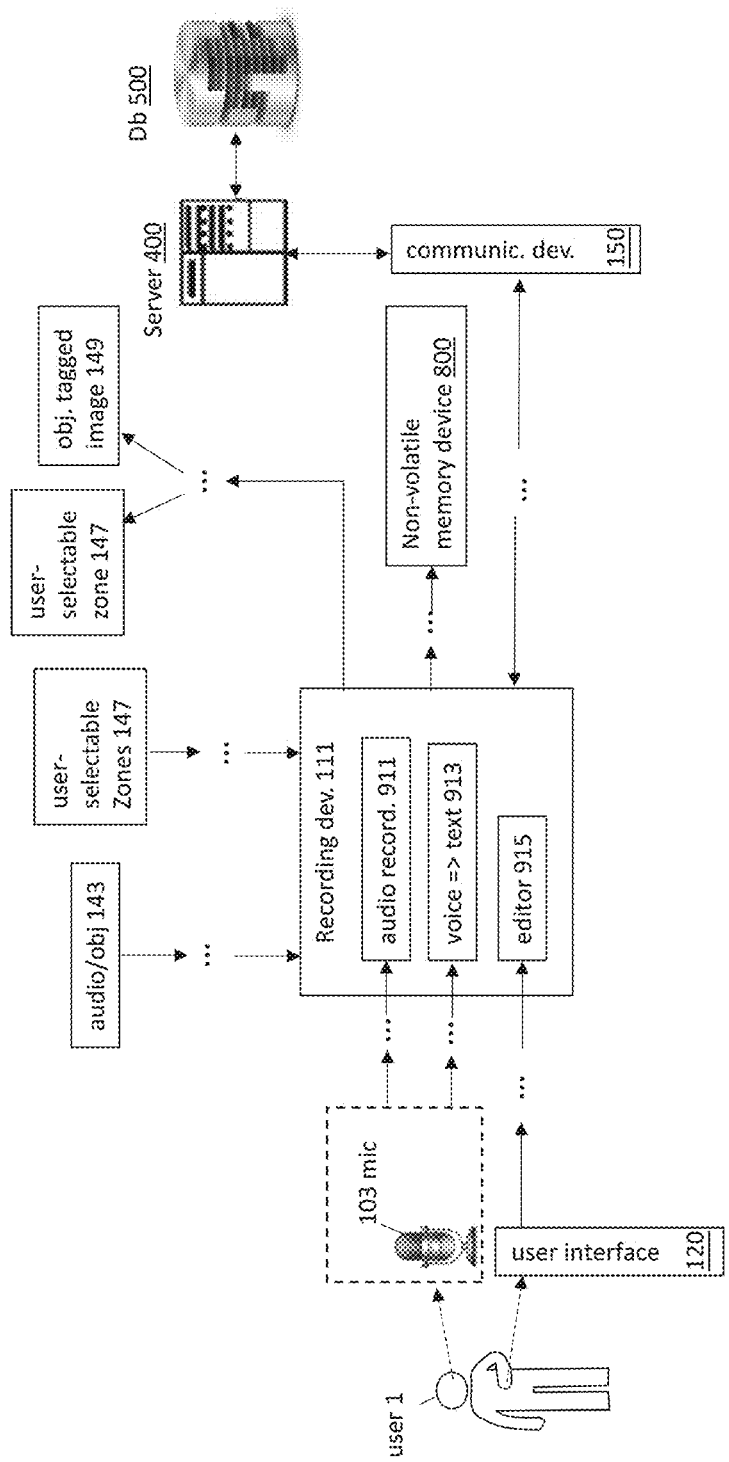
FIG. 1D is a more detailed schematic diagram of the recording device of FIG. 1A with related elements.

FIG. 1D shows a more detailed recording device 111 of FIG. 1A along with other elements of FIG. 1A. The user 1 speaks into microphone 103 which is passed to voice to text conversion device 913. Voice to text device 913 then stores the synthesized text into the field that is stored in user-selectable zone memory 147 and/or object, or in tagged image memory 149.

Explained more directly, the current invention exhibits increased ease of use, as a user clicks an obvious red "record" button and gets an instruction to tap on any spot to record something about it. In another embodiment, the user may double-tap, double click or use another commonly known user input action to record an overview of the entire picture (which might be a description of the location, for example). When finished recording, the user may either tap another spot to start a recording there or tap the square stop button to end record mode. This is more elegant than the tap and hold alternate approach—the user just keeps tapping and recording with no decisions or tradeoffs to make.

User 1 is also able to erase existing user-selectable zones and their associated object data files by activating a pre-defined control on the user interface 120.

User 1 also may record over existing user-selectable zones replacing their associated object data files by activating a predefined control on the user interface 120.

User-Selectable Zone Size/Shape

In one embodiment, the controller 110 defines a region around the location selected by the user. This may have a defined radius in one embodiment.

In another embodiment, the radius may be selected based upon the size of objects in the image.

In another embodiment, the system can use image segmentation principles to identify objects in the image. The user-selectable zone is then identified as the segmented object which has the location selected by the user. For example, in the image of FIG. 3A, Uncle Al can easily be segmented out of the image. Therefore, any location on Uncle Al would be considered part of the user-selectable zone.

In another embodiment, the user may draw a line which encloses the user-selectable zone. This may be by drawing with the user's finger on the touch-sensitive screen or any conventional method used in drawing or paint programs.

Data Formats

In optional data format, playback information or at least a portion of the player or codec, is merged into the file. As indicated above, it should have its own unique identifier, such as "*.tin", or "*.tip". The star "*" indicates where the filename would be. The "t" and "i" indicate that it is an image file that was tagged with an object.

The last letter relates to playback information. "p" indicates that playback information is embedded. "n" indicates no playback information is embedded.

In an alternative embodiment, the filename extension could use "*.sse" to indicate an OTI file". (Any other unique filename extensions may be used, provided that the naming and usage is consistent.)

Assign Background Music

Figure 2F:
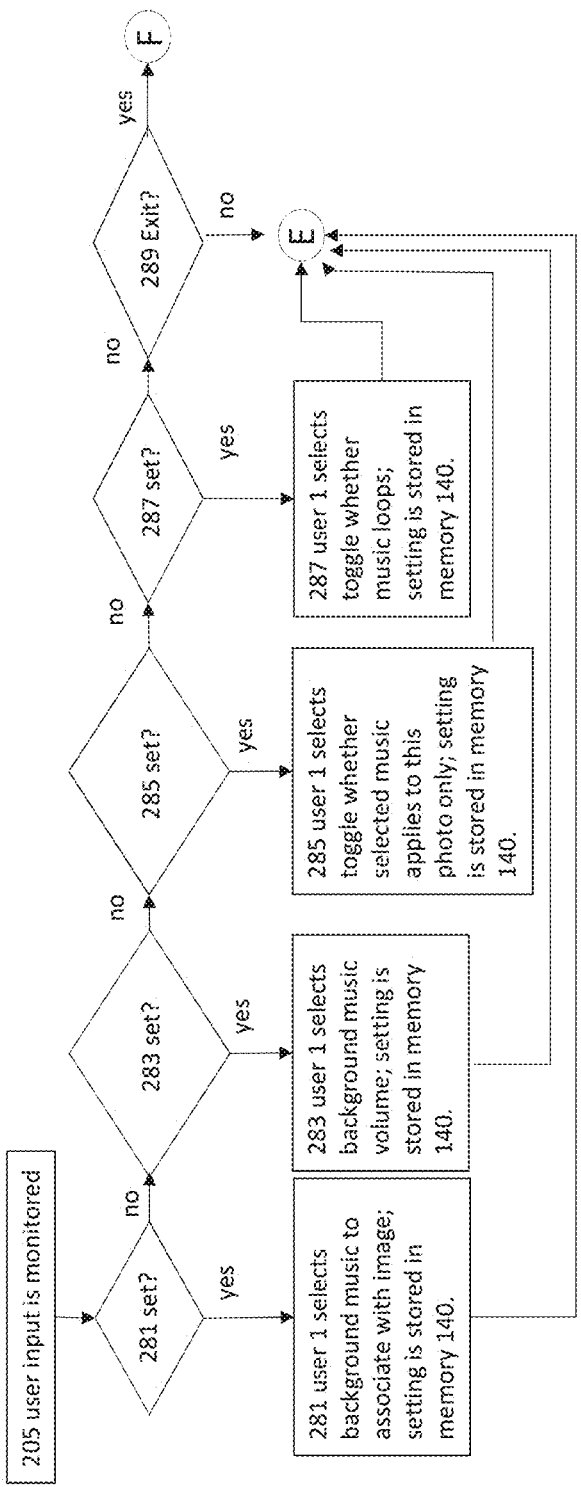

In step 281 (shown on FIG. 2F), user 1 is enabled to select an icon on the image 5, which opens a background music settings panel to associate that allows user 1 to designate music to be played back when auto playback mode is activated for image 5.

User 1 can select from their library of stored music (e.g. an iTunes Library) or can select music from a menu of recordings, which may be stored in memory 140, connected media, or in a remote server 400. Alternatively, user 1 can select that no background music be assigned to image 5. User 1's selection is stored in memory 140. In an embodiment, user 1 may have the option to purchase music through an online service.

In step 283, user 1 may select the background music default volume.

In step 285, user 1 may selects a toggle switch designating whether the selected music applies to this photo only or whether it applies to all photos in an album.

In step 287, user 1 selects a toggle switch designating whether the music repeats after it finished ('loops') or stops playing when it has reached its end.

In step 289, user 1 may exit the background music settings panel at any time simply by selecting (touching when using a touch screen device) any portion of the user interface 120 that is not displaying the background music settings panel.

From the background music settings panel, user 1 can set or change any of the above settings in any order.

The settings selected above are automatically stored in the image memory 145 of memory 140 along with other information relating to the overall image when user 1 selects or changes a setting.

Tagged Image File, Embodiment 1

In a first embodiment of the system, a packing device 113 merges the image file, an indication of the touch-sensitive, clickable or otherwise selectable user-selectable zones and object data files associated with each user-selectable zone into an "object tagged image (OTI) file also referred to in this application as a "OTI file." The file has a unique filename extension identifying it as an Object Tagged Image (OTI) file.

In this format, the object data, which may be sound clips, is merged into the file containing the image. Therefore, the object data is always available with the image data.

Tagged Image File, Embodiment 2

Information defining the decoding used by the player, such as the codec, may be embedded in the file. In this manner, the object data can always be played back since the information defining a compatible player is now part of the file.

The datafile for this embodiment includes the same information as that for Embodiment 1 above, but additionally includes information as to how the recording device encoded the object data. This can be used to later encode additional tags if the recorder is no longer available.

Merge Code Into Image

The files can get large when portions of the player and recorder are added to the file, even in abbreviated form. One way to make the files smaller is to use the least significant bits of the image file. This means of reducing file size may cause the colors of the image to be slightly altered.

Packing device 113 is responsible for merging the information above into an OTI file.

User Interface

Even though the example above describes a touchscreen as a user interface, many other known user interfaces may be used. For example, it may be one of the group consisting of a touch-sensitive screen, a clicking input device, a mouse, trackpad, and other input device capable of selecting a location for embedding a user-selectable zone, even someday just looking at a user-selectable zone in a virtual reality device.

Non-volatile Memory Device Produced

By operating the system of FIG. 1A according to the process of FIGS. 2A-2E, a product by process is created. This product is a non-volatile memory 800 with a specific magnetic pattern stored on the non-volatile memory 800 such that when read by a compatible player 115, it displays the stored image and user-selectable zones and plays the object data related to each specific user-selectable zone when selected by the user.

The non-volatile memory 800 also may employ playback information indicating how the object can be decoded.

It also may include part or all of the playback device 115.

The current disclosure describes several embodiments of the invention. The actual coverage of the invention is not limited to these embodiments. A user input action assigned to each function as described above may be changed to other known user input actions and still fall under the spirit of the invention. Also, the invention covers all currently known computing devices and their input/output equipment. The current invention may be used on any of these.

Although a few examples have been shown and described, it will be appreciated by those skilled in the art that various changes and modifications might be made without departing from the scope of the invention, as defined in the appended claims.

What is claimed is:

1. A non-transitory computer-readable storage medium storing instructions that, when executed by at least one computer, cause the at least one computer to perform operations comprising:
   receiving a data file;
   extracting, from the data file, an image;
   identifying, from the data file, a plurality of user-selectable zones corresponding to locations on the image, wherein the data file is a unitary file in which the image, a plurality of object files, the plurality of user-selectable zones, and associations of the plurality of object files with the plurality of user-selectable zones are merged;
   generating, for display on a display screen, the image with a visual indication of each of the user-selectable zones at the locations on the image;
   upon receiving a user input, causing to be played, using at least one of an audio output device or the display screen, at least one of the plurality of object files included in the data file, wherein the object files include at least one of an audio file or a video file; and
   causing, on the display screen, a portion of the image inside a respective one of the user-selectable zones to be made more visually prominent upon playing the at least one of the plurality of object files associated with the respective one of the user-selectable zones is using the at least one of the audio output device or the display screen.

2. The non-transitory computer-readable storage medium of claim 1, wherein the instructions, when executed by the at least one computer, further cause the at least one computer to perform operations comprising:
   extracting, from the data file, a codec; and decoding the data file using the codec, whereby the user-selectable zones are identified by the at least one computer using the codec.

3. The non-transitory computer-readable storage medium of claim 1, wherein the user input is a user selection of one of the plurality of user-selectable zones, and the at least one computer causes to be played at least one of the plurality of object files that is associated, in the data file, with the user selected one of the plurality of user-selectable zones.

4. The non-transitory computer-readable storage medium of claim 1, wherein the instructions, when executed by the at least one computer, further cause the at least one computer to perform operations comprising:
   identifying, from the data file, a playback order for the plurality of user-selectable zones; and
   upon receiving the user input, causing to be played, using at least one of the audio output device or the display screen, the plurality of object files associated with the plurality of user-selectable zones according to the playback order.

5. The non-transitory computer-readable storage medium of claim 2, wherein the data file is the unitary file in which the codec is also merged.

6. The non-transitory computer-readable storage medium of claim 1, wherein the data file has a filename extension indicating that the data file is an object tagged image file.

7. The non-transitory computer-readable storage medium of claim 1, wherein:
   the display screen is a touch-sensitive display screen; and
   the instructions, when executed by the at least one computer, further cause the at least one computer to perform operations comprising:

receiving, as the user input, an indication from the touch-sensitive display screen that a user has touched one of the plurality of user-selectable zones, and causing to be played at least.

8. The non-transitory computer-readable storage medium of claim 1, wherein the instructions, when executed by the at least one computer, further cause the at least one computer to perform operations comprising: the receiving the data file including acquiring the data file from at least one of a cloud server or the non-transitory computer-readable storage medium.

9. The non-transitory computer-readable storage medium of claim 1, wherein the instructions, when executed by the at least one computer, further cause the at least one computer to perform operations comprising: using the audio output device, causing music to be played while displaying the image.

10. The non-transitory computer-readable storage medium of claim 1, wherein the instructions, when executed by the at least one computer, further cause the at least one computer to perform operations comprising: prior to extracting the image, detecting that the data file is in an object tagged image file format.

11. A computer-implemented method, comprising:
receiving a data file;
extracting, from the data file, an image;
identifying, from the data file, a plurality of user-selectable zones corresponding to locations on the image,
wherein the data file is a unitary file in which the image, a plurality of object files, the plurality of user-selectable zones, and associations of the plurality of object files with the plurality of user-selectable zones are merged;
generating, for display on a display screen, the image with a visual indication of each of the user-selectable zones at the locations on the image;
upon receiving a user input, causing to be played, using at least one of an audio output device or the display screen, at least one of the plurality of object files included in the data file, wherein the object files include at least one of an audio file or a video file; and
causing, on the display screen, a portion of the image inside a respective one of the user-selectable zones to be made more visually prominent upon playing the at least one of the plurality of object files associated with the respective one of the user-selectable zones is using the at least one of the audio output device or the display screen.

12. The computer-implemented method of claim 11, further comprising:
extracting, from the data file, a codec; and decoding the data file using the codec, whereby the user-selectable zones are identified using the codec.

13. The computer-implemented method of claim 11, wherein the user input is a user selection of one of the plurality of user-selectable zones, and the computer-implemented method further comprises:
causing to be played at least one of the plurality of object files that is associated, in the data file, with the user selected one of the plurality of user-selectable zones.

14. The computer-implemented method of claim 11, further comprising:
identifying, from the data file, a playback order for the plurality of user-selectable zones; and
upon receiving the user input, causing to be played, using at least one of the audio output device or the display screen, the plurality of object files associated with the plurality of user-selectable zones according to the playback order.

15. The computer-implemented method of claim 12, wherein the data file is the unitary file in which the codec is also merged.

16. The computer-implemented method of claim 11, wherein the data file has a filename extension indicating that the data file is an object tagged image file.

17. The computer-implemented method of claim 11, wherein the display screen is a touch-sensitive display screen, and the method further comprises:
receiving, as the user input, an indication from the touch-sensitive display screen that a user has touched one of the plurality of user-selectable zones, and causing to be played at least one of the plurality of object files that is associated, in the data file, with the touched one of the plurality of user-selectable zones.

18. The computer-implemented method of claim 11, further comprising:
the receiving the data file including acquiring the data file from at least one of a cloud server or a non-transitory computer readable storage medium.

19. The computer-implemented method of claim 11, further comprising:
using the audio output device, causing music to be played while displaying the image.

20. The computer-implemented method of claim 11, further comprising:
prior to extracting the image, detecting that the data file is in an object tagged image file format.

* * * * *